ized Patent [19]

United States Patent [19]
Rutherford

[11] 3,964,038
[45] June 15, 1976

[54] WIND INDICATOR
[76] Inventor: Talmadge O. Rutherford, P.O. Box 903, Rte. 1, Clanton, Ala. 35045
[22] Filed: July 7, 1975
[21] Appl. No.: 593,633

[52] U.S. Cl. .............................. 340/241; 73/189; 200/81.9 R
[51] Int. Cl.² .................................... G08B 21/00
[58] Field of Search ............... 340/241; 200/81.9 R; 73/170 R, 189

[56] References Cited
UNITED STATES PATENTS
3,162,847  12/1964  Huffman ................... 200/81.9 R
3,534,191  10/1970  Siakel ........................ 340/241
3,537,088  10/1970  Wells ......................... 340/241

FOREIGN PATENTS OR APPLICATIONS
959,297  5/1964  United Kingdom ............ 340/241

Primary Examiner—S. Clement Swisher
Assistant Examiner—Denis E. Corr
Attorney, Agent, or Firm—Woodford R. Thompson, Jr.

[57] ABSTRACT

A wind indicator comprising a movable arm supported at one end and carrying a vertically extending cylindrical portion in spaced relation to said one end. An actuator having a round flat surface is carried by said one end of the arm and is movable to selected positions in response to a predetermined increase in wind velocity to move the cylindrical portion laterally. A member having a flat surface in contact with the round flat surface of the actuator supports the actuator for rocking movement in response to pivotal movement of the arm in any direction. The actuator is operatively connected to a warning device to actuate the same upon lateral movement of the cylindrical portion.

7 Claims, 4 Drawing Figures

U.S. Patent   June 15, 1976   3,964,038
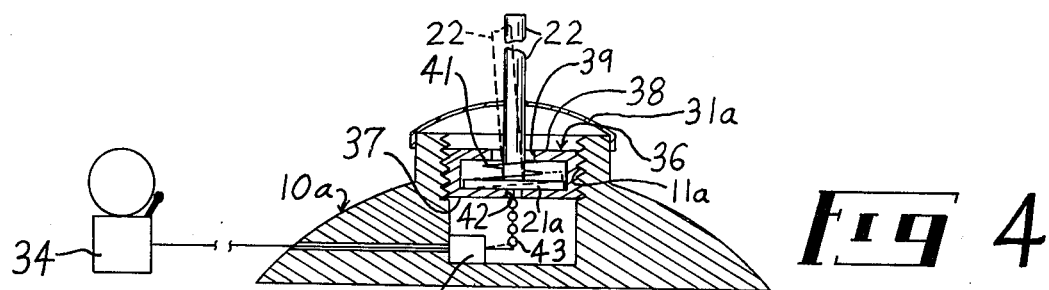
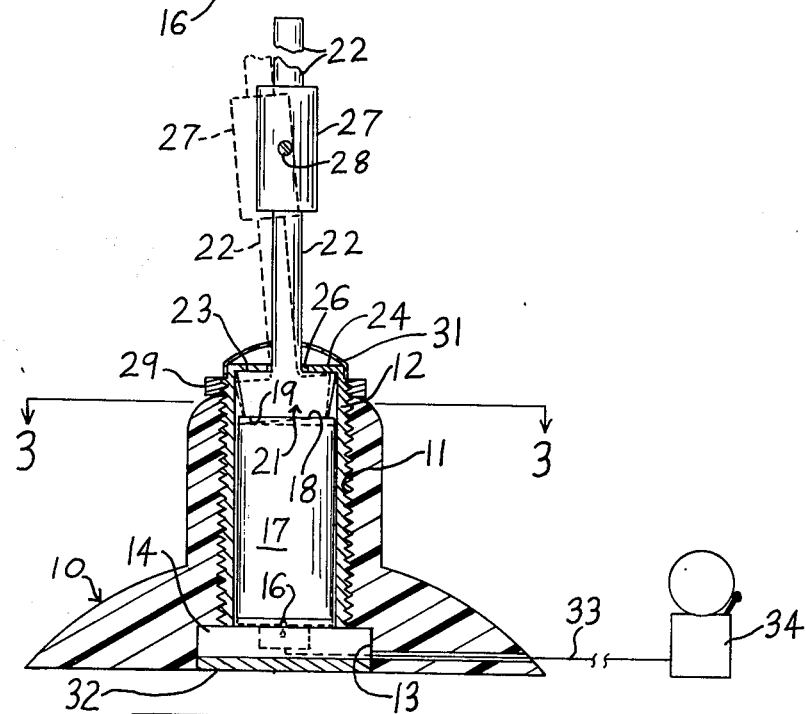
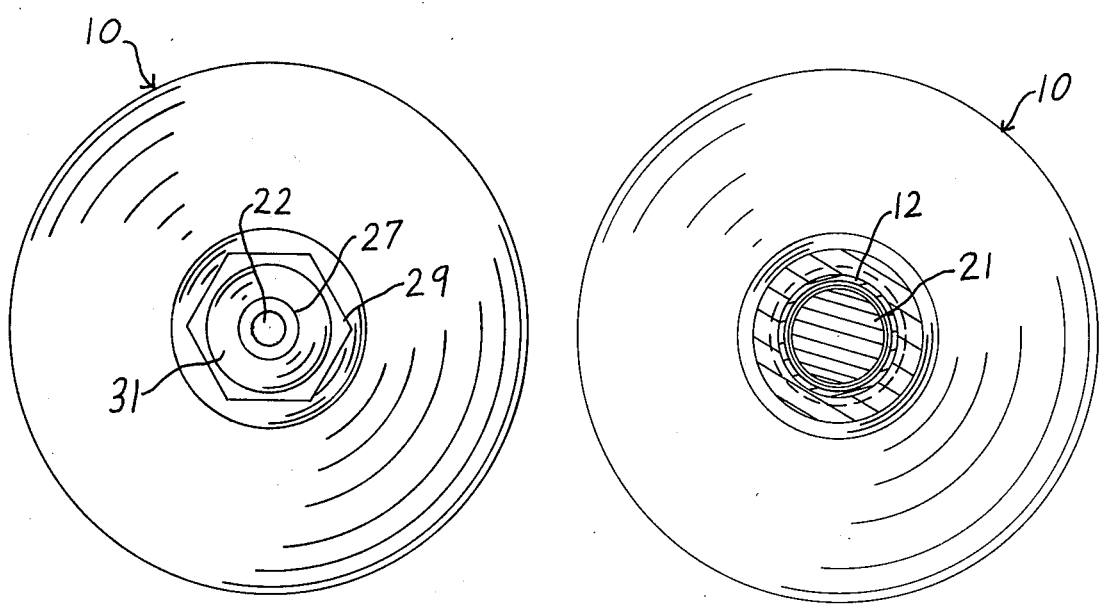

WIND INDICATOR

BACKGROUND OF THE INVENTION

This invention relates to a wind indicator and more particularly to a device for indicating severe weather conditions, such as the approach of a storm.

Heretofore in the art to which my invention relates many devices have been proposed for warning persons of bad weather conditions, such as sudden drops in the barometric pressure. However, such devices do not give a person any warning as to a predetermined increase in wind velocity whereby the person can seek shelter at that time.

SUMMARY OF THE INVENTION

In accordance with my invention, I provide a wind indicator which has a movable arm supported at one end and carrying a vertically extending cylindrical portion in spaced relation to the supported end of the arm. The cylindrical portion is in position for wind to contact as wind passes thereby whereby the device will be actuated regardless of the direction from which the wind approaches. An actuator member is carried by the supported end of the arm and is provided with a round, flat surface adapted to move to selected pivoted positions in response to a predetermined increase in wind velocity sufficient to move the cylindrical portion laterally from a vertical position. The round, flat surface of the actuator member engages a flat surface of a support member so that the actuator member is adapted for rocking movement in response to pivotal movement of the arm in any direction from a vertical position. The actuator member is operatively connected to a warning device whereby the warning device is actuated in response to a predetermined increase in wind velocity to move the cylindrical portion laterally.

DESCRIPTION OF THE DRAWING

Apparatus embodying features of my invention is illustrated in the accompanying drawing, forming a part of this application, in which:

FIG. 1 is a vertical sectional view through the wind indicator, parts being shown in elevation;

FIG. 2 is a top plan view of the wind indicator shown in FIG. 1;

FIG. 3 is a sectional view taken generally along the line 3—3 of FIG. 1; and,

FIG. 4 is a vertical sectional view corresponding to FIG. 1 but showing a modified form of my invention.

DETAILED DESCRIPTION

Referring now to the drawing for a better understanding of my invention, I show a supporting base 10 having a vertically extending internally threaded opening 11 therein for receiving an externally threaded sleeve 12 whereby the sleeve is adapted for vertical adjustment relative to the supporting base 10. As shown in FIG. 1, an enlarged diameter recess 13 is provided in the bottom of the supporting base 10 for receiving a support 14 for an electrical switch element 16, such as a micro-switch.

Mounted for vertical, sliding movement within the sleeve 12 is a support member 17 having its lower end in contact with the switch element 16. The upper end of the support member 17 is provided with a flat supporting surface 18 which is in engagement with a round flat surface 19 of an actuator member 21 carried by the lower end of a movable arm 22. As shown in FIG. 1, the actuator member 21 is provided with an upper flat surface 23 which is engaged by an annular, inturned flange 24 carried by the upper end of the sleeve 12, whereby upward movement of the actuator member 21 is limited. A centrally disposed recess 26 is provided inwardly of the annular flange 24 for receiving the arm 22 whereby the arm 22 may pivot laterally from the solid line position shown in FIG. 1 to the dotted line position.

Mounted on the movable arm 22 in spaced relation to the actuator member 21 is a vertically extending cylindrical member 27 which provides a cylindrical portion for the movable arm 22 which is in position for the wind to contact as wind passes thereby regardless of the direction from which the wind approaches. The cylindrical member 27 is preferably mounted for vertical adjustment along the arm 22. This may be provided by a friction fit between the outer surface of the arm 22 and the inner surface of an opening through the cylindrical member 27 which receives the arm 22 with a friction fit. Also, the cylindrical member 27 may be locked in any selected position by a suitable set screw 28. By moving the cylindrical member 27 to axial positions along the arm 22, the force of the wind required to actuate the device may be varied whereby the device is actuated at a predetermined wind velocity. Where it is desired that the device actuate at one particular wind velocity, the cylindrical member 27 may be secured rigidly to or formed integrally with the arm 22 instead of being adjustably mounted thereon.

The position of the sleeve 12 relative to the supporting base 10 may be fixed by a suitable lock nut 29 which engages the external threads of the sleeve 12, as shown in FIG. 1. To prevent the ingress of foreign materials into the supporting housing, I provide a cup-like seal member 31 which snaps over the upper end of the sleeve 12, as shown. A suitable opening is provided in the member 31 for receiving the arm 22 whereby the arm is adapted to move freely from the solid line position to the dotted line position. The seal 31 is preferably of a thin flexible material which does not interfere with movement of the arm 12. However, if desired, the opening in the seal member 31 for receiving the arm 21 may be of a size to permit lateral movement of the arm 22 without actually contacting the seal. Also, a plug-type seal member 32 snaps into the lower portion of the opening 13 provided in the bottom of the base member 10. As shown in FIG. 1, the switch element 16 is operatively connected by suitable electrical leads 33 to a warning device indicated generally at 34, which may be in the form of a bell, buzzer, light or any other means which would warn a person that there is a predetermined increase in wind velocity.

From the foregoing description, the operation of my wind indicator shown in FIGS. 1, 2 and 3 will be readily understood. The wind indicator is positioned in an open space whereby the wind can pass the cylindrical member 27 regardless of the direction from which the wind approaches. The warning device 34 is mounted in a convenient position to warn a person that the velocity of the wind has increased to a predetermined point. For example, the warning device 34 may be positioned in a bedroom or other rooms of a house. The sleeve 12 is adjusted relative to the supporting base 10 by rotating the sleeve until the inturned flange 24 is adjacent the upper flat surface 23 of the actuator member 21 with the lower end of the movable member 17 engaging the movable element of the switch element 16. In this position, any lateral movement of the cylindrical member 27 and the upper portion of the arm 22 will cause the actuator member 21 to pivot with its lower flat surface 19 being adapted for rocking movement relative to the upper flat surface 18 of the movable member 17. Accordingly, the lower surface 19 of the actuator member 21 moves to the dotted line position shown in FIG. 1 whereupon the movable member 17 then moves to the dotted line position to depress the switch element 16 and thus actuate the warning device 34. Where it is desired to change the position of the cylindrical member 27 relative to the arm 22, the cylindrical member 27 is merely moved axially along the arm 22 to the selected position and then may be locked in position by the set screw 28. Accordingly, the predetermined velocity of the wind at which the warning deivce 34 will be energized may be readily varied. However, as pointed out above, the cylindrical member 27 may be formed integrally with the arm 22 or secured permanently thereto where the wind indicator is to operate at a particular wind velocity at all times.

Referring now to FIG. 4 of the drawing, I show a modified form of my invention in which an internally threaded opening 11a is provided in a supporting base 10a for receiving the external threads of a cup-like member 36 having a flat bottom wall 37 and an inturned annular flange 38 adjacent the upper end thereof. A centrally disposed opening 39 is provided inwardly of the annular flange 38 for receiving a movable arm 22 which carries a disc-like actuator member 21a at its lower end. The flat undersurface of the disc 21a engages the adjacent flat surface of the bottom wall 37 whereby the disc 21a is adapted for rocking movement relative to the bottom wall 37. A compression spring 41 surrounds the arm 22 between the disc 21a and the inturned annular flange 38 whereby the disc 21a is urged downwardly into engagement with the adjacent flat surface of the bottom wall 37. A centrally disposed opening 42 is provided in the bottom wall 37 for receiving a flexible member 43, such as a chain, which is connected at its upper end to the center of the disc 21a and at its lower end to the movable element of a switch unit 16 which in turn is operatively connected to a warning device 34, as described hereinabove. A suitable cover 31a is adapted to snap over the upper end of the supporting base 10a, as shown, to prevent the ingress of foreign materials into the apparatus.

The movable arm 22 carries a cylindrical member 27, as described hereinabove relative to FIGS. 1 through 3. Accordingly, upon a predetermined increase in wind velocity, the force of the wind against the cylindrical member 27 carried by the arm 22 moves the arm 22 laterally to the dotted line position shown in FIG. 4 whereupon the disc 21a is rocked on the flat bottom wall 37 of the cup-shaped member 36 to thus elevate the upper end of the flexible member 43 to thus actuate the switch element 16 whereby the warning device 34 is energized.

From the foregoing, it will be seen that I have devised an improved wind indicator. By providing the actuating members 21 and 21a which are adapted for rocking movement relative to the subjacent supporting surface, together with the movable arm 22 carrying the cylindrical member 27, my improved wind indicator is operable in response to a small change in wind velocity whereby the warning device is actuated at a precise wind velocity. Also, by providing a round actuator member 21 or 21a, as the case may be, the movable arm 22 is adapted for pivotal movement in any direction regardless of the direction from which the wind approaches. Furthermore, by providing the cylindrical surface on the member 27, the wind strikes a surface having the same curvature regardless of the direction from which the wind approaches.

While I have shown my invention in two forms, it will be obvious to those skilled in the art that it is not so limited but is susceptible to various other changes and modifications without departing from the spirit thereof.

What I claim is:

1. A wind indicator for indicating a predetermined increase in wind velocity comprising:
   a. a movable arm supported adjacent one end and carrying a vertically extending cylindrical portion in spaced relation to said one end in position for wind to contact as wind passes thereby,
   b. an actuator member carried by said one end of said movable arm and having a round, flat surface at one end thereof adapted to move to selected pivotal positions in response to a predetermined increase in wind velocity sufficient to move said cylindrical portion laterally from a vertical position,
   c. a support member mounted in a supporting housing for vertical movement and having a flat surface in contact with said round flat surfaces of said actuator member supporting said actuator member for rocking movement in response to pivotal movement of said movable arm in any direction with said support member being movable in a vertical direction in response to said rocking movement of said actuator member, and
   d. means operatively connecting said support member to a warning device so that said warning device is actuated in response to said predetermined increase in wind velocity to move said cylindrical portion laterally.

2. A wind indicator as defined in claim 1 in which said supporting housing comprises:
   a. a supporting base having a vertically extending, internally threaded opening therein,
   b. an externally threaded sleeve mounted within and in threaded engagement with said internally threaded opening and adapted to receive said support member with a sliding fit,
   c. an inturned flange carried by the upper end of said sleeve in position to engage and limit upward movement of the upper end of said actuator member so that upon rocking movement of said actuator member said support member moves downward.

3. A wind indicator as defined in claim 2 in which a lock nut is carried by said externally threaded sleeve to retain said sleeve at selected axial positions relative to said supporting base.

4. A wind indicator as defined in claim 2 in which a switch element is carried by said supporting housing in position to be engaged by said support member upon downward movement thereof and said switch element is operatively connected to said warning device.

5. A wind indicator as defined in claim 4 in which sealing means is provided adjacent both ends of the opening through said supporting housing to prevent the ingress of foreign materials therein.

6. A wind indicator for indicating a predetermined increase in wind velocity comprising:
   a. a movable arm supported adjacent one end, b. a movable member mounted on said movable arm and adapted for vertical adjustment relative thereto and carrying a vertically extending cylindrical portion in spaced relation to said one end of said movable arm in position for wind to contact as wind passes thereby;

c. an actuator member carried by said one end of said movable arm and having a round, flat surface at one end thereof adapted to move to selected pivotal positions in response to a predetermined increase in wind velocity sufficient to move said cylindrical portion laterally from a vertical position, d. a support member having a flat surface in contact with said round flat surface of said actuator member supporting said actuator member for rocking movement in response to pivotal movement of said movable arm in any direction, and e. means operatively connecting said actuator member to a warning device so that said warning device is actuated in response to said predetermined increase in wind velocity to move said cylindrical portion laterally.

7. A wind indicator for indicating a predetermined increase in wind velocity comprising:

a. a movable arm supported adjacent one end, b. a movable member mounted on said movable arm and adapted for vertical adjustment relative thereto and carrying a vertically extending cylindrical portion in spaced relation to said one end of said movable arm in position for wind to contact as wind passes thereby, c. a cup-shaped member having a flat bottom surface receiving said round flat surface of said actuator member and supporting said actuator member for rocking movement in response to pivotal movement of said movable arm in any direction, d. there being a centrally disposed opening through the bottom of said cup-shaped member, e. a flexible connector element extending through said centrally disposed opening and connected at one end to the central portion of said actuator member with the other end of said flexible connector element being operatively connected to a warning device so that said warning device is actuated in response to said predetermined increase in wind velocity to move said cylindrical portion laterally, and f. means urging said actuator member into engagement with said flat bottom surface whereby said movable arm is urged toward a vertical position.

* * * * *